United States Patent Office 3,412,181
Patented Nov. 19, 1968

---

3,412,181
PERFLUORO PHOSPHATES
Robert A. Braun, Newark, Del., assignor to E. I. du Pont de Nemours and Company, Wilmington, Del., a corporation of Delaware
No Drawing. Filed Apr. 9, 1965, Ser. No. 447,088
3 Claims. (Cl. 260—955)

ABSTRACT OF THE DISCLOSURE

Phosphate esters of the formula

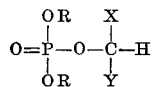

where R can be substituted and unsubstituted aliphatic hydrocarbon radicals or substituted and unsubstituted phenyl radicals, and X and Y are perfluoroalkyl radicals, useful as wetting agents, high temperature lubricants and anti-fouling additives for gasoline and motor oil.

---

This invention relates to phosphate esters substituted with perfluoroalkyl groups. It is more particularly directed to compounds having the formula (1)

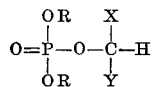

where

R can be an aliphatic hydrocarbon radical of 1 through 18 carbon atoms, a phenyl radical, or an aliphatic hydrocarbon radical of 1 through 18 carbon atoms or phenyl radical substituted with alkyl of 1 through 5 carbon atoms, alkoxy of 1 through 5 carbon atoms, cyano, chloro, bromo, or fluoro and X and Y are the same or different and can be perfluoroalkyl radicals of 1 through 5 carbon atoms.

The compounds of the invention are either liquids or solids with low melting points. They are also non-flammable and, speaking generally, stable at temperatures up to 200° C.

The liquid compounds and the solid compounds (when molten) have low surface tensions. They are therefore useful as wetting agents, as lubricants in high temperature applications, and as anti-fouling additives in gasoline and in motor oil.

The compounds of the invention are prepared by reacting a hydrogen phosphite with a perfluoroketone according to the following equation:

(2) *

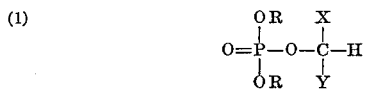

where R, X and Y are defined as in Formula 1.

The reaction is carried out in an open vessel or in a bomb, at autogeneous pressure, at temperatures of from

---

\* The hydrogen phosphite reactants are either available commercially or can be prepared according to the method disclosed in G. M. Kofalapoff, "Organophosphorus Compounds," pp. 196–199, John Wiley, New York, 1950. The ketone reactants are also available commercially, or can be prepared according to the method disclosed in U.S. Patent 2,853,524.

---

0° C. to 150° C. Stoichiometric quantities of reactants are used and no solvent is required. The reaction is quite rapid and is ordinarily complete in from 2 to 6 hours.

The product is recovered from the reaction mass by stripping off excess ketone reactant, if any, under vacuum or by warming the mass. The remaining liquid is a substantially pure compound of the invention, which can, if desired, be further purified by fractional distillation.

The following representative examples are given so that the invention may be more easily understood and readily practiced. Those compounds not specifically shown can be prepared by the same general methods described, by making appropriate reactant substitutions where necessary. All parts are by weight.

Example 1

Hexafluoroacetone (100 parts, 0.6 mole) was added to dimethyl hydrogen phosphite (66 parts, 0.6 mole) at −20° C. The mixture was warmed to and held to 25° C. for 2 hours and then at 50° C. for two additional hours. The resulting liquid was then brought to room temperature and fractionated to give 121 parts of a compound having the formula

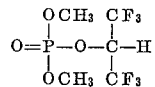

The compound had a boiling point of 168° C. at 760 mm. of pressure and a refractive index $n_D^{25}$ 1.3279.

*Analysis.*—Calc'd for $C_5H_7F_6PO_4$: C, 21.75; H, 2.56; Fl, 41.29; P, 11.22. Found: C, 22.31; H, 2.57; Fl, 41.35; P, 11.34.

A drop of this compound completely wetted a surface of "Teflon"® TFE-fluoro-carbon resin when applied to it, as contrasted with a drop of ordinary lubricating oil, which beaded.

The compound was heated for 48 hours at its boiling point without any observable color change or decomposition.

Example 2

Hexafluoroacetone (66 parts, 0.4 mole) and diphenyl hydrogen phosphite (46.8 parts, 0.2 mole) were heated at 150° C. for 8 hours in a stainless steel bomb. The resulting liquid product, 91 parts, was then fractionated to give 66.6 parts of a liquid having a boiling point of 140° C. at 1.75 mm. of pressure.

This liquid crystallized on standing at room temperature. The resulting solid, having the formula

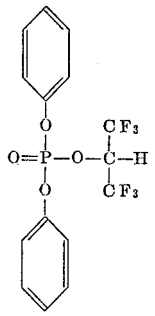

had a melting point of 35–36° C.

*Analysis.*—Calc'd for $C_{15}H_{11}F_6PO_4$: C, 45.01; H, 2.77; F, 28.49; P, 7.74. Found: C, 45.37; H, 3.01; F. 29.18; P, 7.63.

Example 3

A mixture of di-(2-ethylhexyl)hydrogen phosphite (153.2 parts, 0.5 mole) and hexafluoroacetone (83 parts, 0.5 mole) was heated at 50° C. for 6 hours in a bomb. The resulting liquid, 249 parts, was then stripped under vacuum to remove excess ketone reactant, to give 227 parts of residue which was substantially pure di-(2-ethylhexyl) hexafluoropropyl phosphate having the formula $$\begin{array}{c} C_2H_5 \\ | \\ CH_2CHCH_2CH_2CH_2CH_3 \\ | \\ O \quad\quad CF_3 \\ | \quad\quad | \\ O=P-O-C-H \\ | \quad\quad | \\ O \quad\quad CF_3 \\ | \\ CH_2CH-CH_2CH_2CH_2CH_3 \\ | \\ C_2H_5 \end{array}$$

The product was a viscous oil having a refractive index $n_D^{25}$ 1.4065.

*Analysis.*—Calc'd for $C_{19}H_{35}F_6PO_4$: C, 48.30; H, 7.47; P, 6.56; F, 24.13. Found: C, 48.19; H, 7.32; F, 24.77; P, 6.52.

In the preceding examples, one can use the indicated quantities of the following listed ketones in place of hexafluoroacetone to obtain the corresponding compounds of the invention.

| Ketone | Amount | Product |
|---|---|---|
| $CF_3\overset{\overset{O}{\|\|}}{C}-C_2F_5$ | 108 | $\begin{array}{c}C_2H_5\\|\\CH_2CHCH_2CH_2CH_2CH_3\\|\\O\quad CF_3\\|\quad|\\O=P-O-C-H\\|\quad|\\O\quad C_2F_5\\|\\CH_2CHCH_2CH_2CH_2CH_3\\|\\C_2H_5\end{array}$ |
| $C_3F_7\overset{\overset{O}{\|\|}}{C}-C_3F_7$ | 183 | $\begin{array}{c}C_2H_5\\|\\CH_2CHCH_2CH_2CH_2CH_3\\|\\O\quad C_3F_7\\|\quad|\\O=P-O-C-H\\|\quad|\\O\quad C_3F_7\\|\\CH_2CHCH_2CH_2CH_2CH_3\\|\\C_2H_5\end{array}$ |
| $C_2F_5\overset{\overset{C}{\|\|}}{C}C_2F_5$ | 133 | $\begin{array}{c}C_2H_5\\|\\CH_2CHCH_2CH_2CH_2CH_3\\|\\O\quad C_2F_5\\|\quad|\\O=P-O-C-H\\|\quad|\\O\quad C_2F_5\\|\\CH_2CHCH_2CH_2CH_2CH_3\\|\\C_2H_5\end{array}$ |
| $C_5F_{11}\overset{\overset{O}{\|\|}}{C}C_5F_{11}$ | 283 | $\begin{array}{c}C_2H_5\\|\\CH_2CHCH_2CH_2CH_2CH_3\\|\\O\quad C_5F_{11}\\|\quad|\\O=P-O-C-H\\|\quad|\\O\quad C_5F_{11}\\|\\CH_2CHCH_2CH_2CH_2CH_3\\|\\C_2H_5\end{array}$ |

Similarly, in place of the phosphite reactants used in the preceding examples, one can use the indicated quantities of the following listed phosphites, to obtain the corresponding products:

| Phosphite | Amount | Product |
|---|---|---|
| $(n\text{-}C_{18}H_{37}O)_2\overset{\overset{O}{\|\|}}{P}-H$ | 293 | $\begin{array}{c}C_{18}H_{37}\\|\\O\quad CF_3\\|\quad|\\O=P-O-C-H\\|\quad|\\O\quad CF_3\\|\\C_{18}H_{37}\end{array}$ |
| $(CH_3OCH_2CH_2O)_2\overset{\overset{O}{\|\|}}{P}-H$ | 99 | $\begin{array}{c}CH_2CH_2OCH_3\\|\\O\quad CF_3\\|\quad|\\O=P-O-C-H\\|\quad|\\O\quad CF_3\\|\\CH_2CH_2OCH_3\end{array}$ |
| $(NC-CH_2-CH_2-O)_2\overset{\overset{O}{\|\|}}{P}-H$ | 70 | $\begin{array}{c}CH_2CH_2CN\\|\\O\quad CF_3\\|\quad|\\O=P-O-CH\\|\quad|\\O\quad CF_3\\|\\CH_2CH_2CN\end{array}$ |
| $(Cl-CH_2CH_2-O)_2\overset{\overset{O}{\|\|}}{P}-H$ | 79.5 | $\begin{array}{c}CH_2CH_2Cl\\|\\O\quad CF_3\\|\quad|\\O=P-O-CH\\|\quad|\\O\quad CF_3\\|\\CH_2CH_2Cl\end{array}$ |

What is claimed is:
1. A compound of the formula

$$\begin{array}{c} OCH_3 \quad CF_3 \\ | \quad\quad | \\ O=P-O-C-H \\ | \quad\quad | \\ OCH_3 \quad CF_3 \end{array}$$

2. A compound of the formula

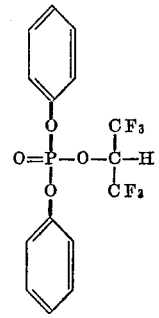

3. A compound of the formula $$\begin{array}{c} C_2H_5 \\ | \\ CH_2CHCH_2CH_2CH_2CH_3 \\ | \\ O \quad\quad CF_3 \\ | \quad\quad | \\ O=P-O-C-H \\ | \quad\quad | \\ O \quad\quad CF_3 \\ | \\ CH_2CHCH_2CH_2CH_2CH_3 \\ | \\ C_2H_5 \end{array}$$

References Cited

UNITED STATES PATENTS 2,929,759  3/1960  Gilbert et al. _____ 260—970

CHARLES B. PARKER, *Primary Examiner.*

A. H. SUTTO, *Assistant Examiner.*